United States Patent

[11] 3,613,535

[72] Inventor Yoshiaki Hirabayashi
  Nagano-ken, Japan
[21] Appl. No. 842,871
[22] Filed July 18, 1969
[45] Patented Oct. 19, 1971
[73] Assignee Sankyo Kogaku Kogyo Kabushiki-Kaisha
  Oaza, Suwa-shi, Nagano-ken, Japan
[32] Priority July 29, 1968
[33] Japan
[31] 43/53008

[54] DEVICE FOR AUTOMATICALLY EFFECTING ADJUSTMENTS OF THE VOLUME OF LIGHT COMING TO AN EXPOSURE METER OF A CAMERA
5 Claims, 5 Drawing Figs.
[52] U.S. Cl. .................................................. 95/10 C, 95/31 FS, 95/64 R, 352/72, 352/141
[51] Int. Cl. ..................................................... G03b19/04, G03b 19/18
[50] Field of Search ............................................ 95/10 C, 31 R, 31 FS, 64 R; 352/72, 78, 141

[56] References Cited
UNITED STATES PATENTS

| | | | |
|---|---|---|---|
| 2,186,613 | 1/1940 | Mihalyi ........................ | 95/64 |
| 3,312,158 | 4/1967 | MacMillin et al............. | 95/10 C |
| 3,386,357 | 6/1968 | Kremp et al. ................. | 95/10 C |
| 3,410,186 | 11/1968 | Kaneko ........................ | 352/72 |
| 3,461,782 | 8/1969 | Katusyama................... | 95/10 C |
| 3,470,799 | 10/1969 | Engelsmann et al.......... | 95/31 X |

Primary Examiner—Joseph F. Peters
Attorney—McGlew and Toren

ABSTRACT: A device for automatically effecting adjustments of the volume of light coming to an exposure meter of a camera using a film cassette having a cutout whose position is determined by the sensitivity of a particular film contained in said film cassette. When such film cassette is inserted in a film cassette housing of the camera, the angle of pivotal motion of a bifurcated member of the camera is determined by the position of said cutout, whereby adjustments of the volume of light incident on the exposure meter can be automatically effected.

PATENTED OCT 19 1971
3,613,535
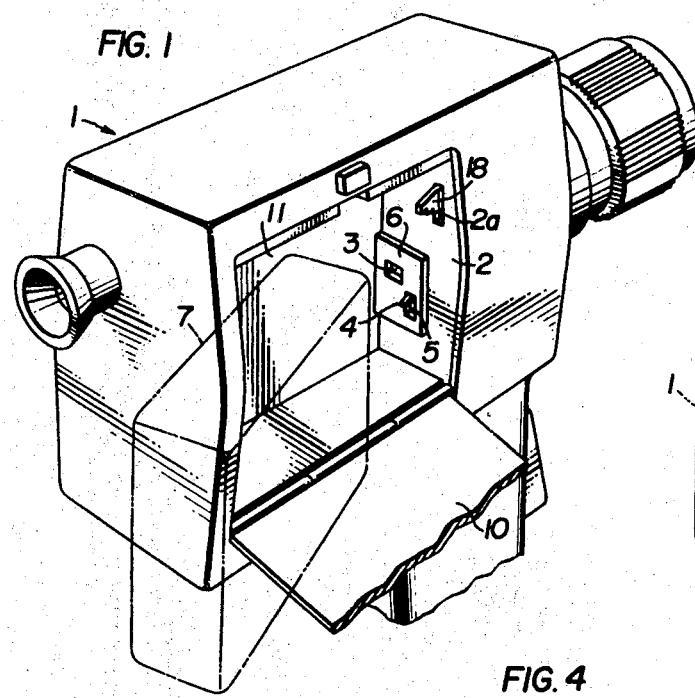
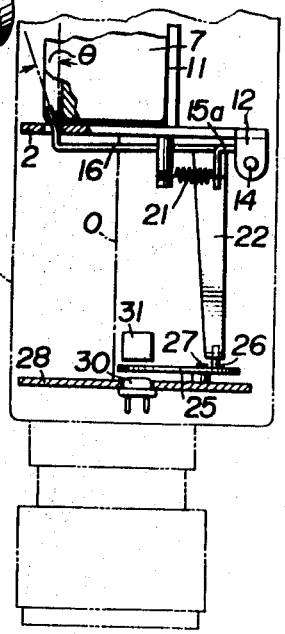
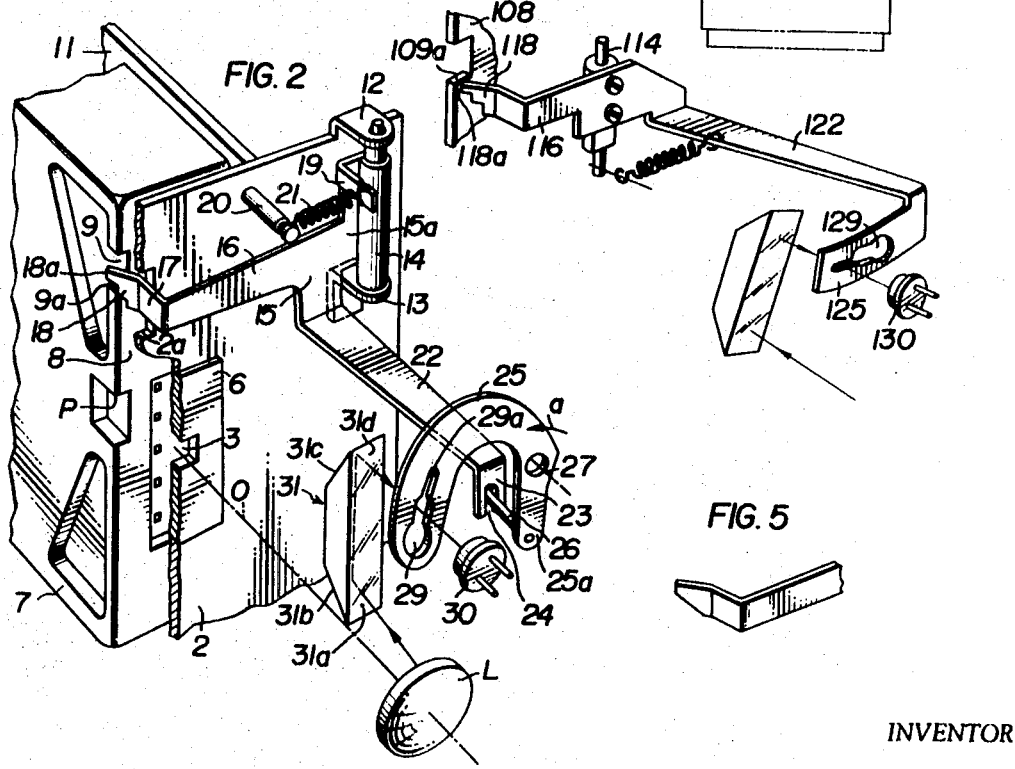
INVENTOR
YOSHIAKI HIRABAYASHI
BY McGlew & Toren
ATTORNEYS

DEVICE FOR AUTOMATICALLY EFFECTING ADJUSTMENTS OF THE VOLUME OF LIGHT COMING TO AN EXPOSURE METER OF A CAMERA

BACKGROUND AND SUMMARY OF THE INVENTION

The present invention relates to an improvement in a device for automatically effecting adjustments of the volume of light coming to an exposure meter of a camera which uses a film cassette formed on its front end wall with a cutout whose position is determined in conformity with the sensitivity of a film contained in the cassette.

Film cassettes are known which are formed on a portion of their front end wall with a cutout whose position is determined in conformity with the sensitivity of films contained in them. Said cutout is formed on one lateral edge of the front wall of the film cassette and the position of one end edge of said cutout is determined in conformity with the sensitivity of a photosensitive film contained in the film cassette.

Cameras using film cassettes of the type described above are also known. The cameras of this type are usually provided with a built-in exposure meter. When the camera with the built-in exposure meter is loaded with a film cassette received in the film cassette housing, the exposure meter is automatically adjusted in conformity with the sensitivity of a particular photosensitive film contained in the film cassette by the action of the cutout. Such automatic exposure meter control devices are provided with an exposure meter control member adapted to be positioned by the cutout of the film cassette. The control member is usually disposed in a space defined by a front wall of the film cassette housing of the camera, or the wall which the front end wall of the film cassette abuts, and the main body of the camera. A part of this control member which extends into the cassette housing through the front wall of the film cassette housing is adapted to be positioned by the cutout formed in the film cassette so as to thereby optionally adjust the exposure meter.

In one form of automatic exposure meter control devices known in the art, loading of the camera with a film cassette requires, as a preliminary operation, to turn aside the part of the exposure meter control member which extends into the film cassette housing to a position in which it does not interfere with the incoming film cassette. Once the film cassette is positioned in the cassette housing in the camera, such part of the exposure meter control member is brought into abutment against one end edge of the cutout in the film cassette. In order that the operation of turning aside said part of the exposure meter control member, in loading the camera with the film cassette and causing the control member to abut against the cutout of the film cassette once the later is disposed in the cassette housing, may be performed smoothly, it has hitherto been customary to provide the camera with means for operating the exposure meter control member in conjunction with the operation of opening and closing a cover of the film cassette housing. Accordingly, the prior art cameras of this type have required a connecting mechanism for operatively connecting the cover of the film cassette housing and the exposure meter control member.

Another form of automatic exposure meter control devices is provided with a plurality of exposure meter control members each having a portion extending into the cassette housing, the positions of these extending parts in the cassette housing being displaced from one another, so that one end edge of the cutout formed in the film cassette can selectively push one of the extending parts of said plurality of control members. This form is advantageous in that the operation of turning aside the control member and causing the same to abut against the cutout can be eliminated. However, this form is not without disadvantages. One of the disadvantages lies in the fact that, depending on the position of the cutout determined in conformity with the sensitivity of the film contained in the film cassette, such extending parts may all be pushed by the front end wall of the incoming film cassette. Since the exposure meter control members are urged by the biasing force of a spring against the film cassette, the film cassette inserted in the cassette housing may be pushed rearwardly, though slightly, by the force exerted rearwardly by these extending portions, on the front end wall of the film cassette, if all the extending portions of the exposure meter control member are brought into abutment against the front end wall of the film cassette. This may prevent accurate control of the exposure meter or cause deviation in the position of the photosensitive film.

Still another form of automatic exposure meter control devices uses an exposure meter control member having a portion extending into the cassette housing and formed with abutting edges arranged in a plurality of steps. These abutting edges are adapted to be pushed by one end edge of the cutout formed in the film cassette so as to cause the control member to move in sliding motion. This form is disadvantageous in that the inability to provide guide means of great length, because of restriction in designing a camera, prevents smooth operation of the exposure meter control member.

Accordingly, an object of the present invention is to provide an exposure meter control device which obviates all the aforementioned disadvantages of exposure meter control devices of the prior art.

Additional objects as well as features and advantages of this invention will become evident from the description set forth hereinafter when considered in conjunction with the accompany drawings.

BRIEF DESCRIPTION OF THE DRAWINGS

FIG. 1 is a perspective view of a movie camera provided with one embodiment of the device for automatically controlling the volume of light coming to an exposure meter of the camera according to this invention, with a film cassette used with this camera being shown in phantom lines;

FIG. 2 is a perspective view of essential portions of the device according to this invention;

FIG. 3 is a plan view of the essential portions of the device according to this invention, with portions of the camera being shown in phantom lines;

FIG. 4 is a perspective view of essential portions of another embodiment of this invention; and FIG. 5 is a fragmentary perspective view of a modified form of abutted edge of an exposure meter control member.

DESCRIPTION OF THE PREFERRED EMBODIMENTS

In FIG. 1 a movie camera 1 is formed on one side with a film cassette housing having a front end wall 2 to which is firmly fixed a gate plate 6 formed with a film gate 3 disposed in alignment with the optical axis O of a taking lens L (see FIG. 2) and a slot 5 having a major dimension disposed vertically for a film advance pawl 4 to move up and down therein. Film advance pawl 4 is adapted to come into engagement with one of the perforations of a photosensitive film contained in a film cassette 7 when the film cassette is inserted in the cassette housing.

The film cassette 7 is of the type which is known and marketed. It is formed with a cutout 9 in a portion of a lateral edge of a front end wall 8. The position of an end edge 9a of said cutout 9 is specifically determined in conformity with the sensitivity of a film contained in the film cassette. More specifically, the distance between a point P, which is selected as a reference position on cassettes of all types, and end edge 9a may vary from cassette to cassette depending on the sensitivity of a photosensitive film contained in a particular film cassette.

Upon closing a cover 10 hinged to a lower edge of an opening of the cassette housing following insertion of the film cassette 7 in the cassette housing, the film cassette 7 is positively fixed in place in the cassette housing without play and a film drive shaft (not shown) mounted substantially in the center of a sidewall 11 of the cassette housing is operatively connected to a film takeup shaft of the film cassette 7.

Mounted on an upper right portion of the front surface of the front end wall 2 are lugs 12 and 13 which rotatably support upper and lower ends respectively of a vertical shaft 14 to which is firmly fixed a base 15a of a bifurcated member 15 serving as an exposure meter control member. Bifurcated member 15 has one arm 16 which extends transversely of the camera along the front end wall 2 and terminates in a rearwardly bent end portion 17 extending into the cassette housing through a slot 2a formed in the front end wall 2. The rearwardly bent end portion 17 has a tip 18 which is abutted by end edge 9a of the cutout 9, and referred to as an abutted tip hereinafter. The butted tip 18 has a rearwardly directed edge which is offset in a plurality of steps. FIG. 2 shows end edge 9a in abutment against a second step of the offset portion of the abutted tip 18.

The bifurcated member 15 is urged in the clockwise direction in FIG. 3 by the biasing action of a spring 21 mounted between a bent arm 19 connected to the base of the bifurcated member and a pin 20 mounted on the front surface of the forward end wall 2. Accordingly, the abutted tip 18 of the bifurcated member 15 is normally urged to extend into the interior of the cassette housing. The resilient force of the spring 21 is relatively low so as to cause the offset portion of the abutted tip 18 to lightly bear against the end edge 9a of the film cassette 7. This eliminates the danger of the abutted tip 18 pushing the film cassette 7 rearwardly.

The bifurcated member 15 has another arm 22 which extends forwardly substantially in parallel relation with the optical axis O and terminates in a downwardly bent portion 23 which is formed with a cutout 24. A slender pin 26, mounted on a tail end portion 25a of a diaphragm plate 25 and projecting rearwardly, is in loose engagement with cutout 24. The diaphragm plate 25 is pivotally mounted on a shaft 27 rotatably connected to an immovable plate 28( See FIG. 3) arranged in a position near to the front surface of the camera. A diaphragm aperture 29, consisting of a plurality of openings varying in width as seen radially from the shaft 27 considered as the center and connected to one another, is formed at a head end portion or free end portion of the diaphragm plate 25. A light-receiving member 30, which may be a phototransistor or a cadmium sulfide component for actuating an exposure meter, is mounted in front of the diaphragm aperture 29, with the front surface of the light-receiving member being directed toward the diaphragm aperture, and a lighting prism 31 is mounted in the rear of the diaphragm aperture, 29. Lighting prism 31 has a light incident surface 31a which receives a part of the light coming through the taking lens L, a first reflecting surface 31b which reflects incident light upwardly, a second reflecting surface 31c which reflects incident light forwardly, and a surface 31d which directs reflected light from the second reflecting surface toward light-receiving member 30.

The amount of pivotal motion of the bifurcated member 15 against the biasing force of the spring 21 when the film cassette 7 is inserted in the cassette housing may vary depending on which step of the offset portion of the abutted tip 18 the end edge 9a of the film cassette 7 abuts against. The angle of rotation of the diaphragm plate 25 is determined by the amount of pivotal motion of the bifurcated member 15. In FIG. 2, the end edge 9a is in abutment against the second step of the offset portion of the abutted tip 18 and the diaphragm aperture disposed in the path of the reflected light from the prism 31 to the light-receiving member 30 is opened to a degree corresponding to the abutment of the end edge 9a against the second step of the abutted tip 18.

Assuming that another film cassette, containing a film differing in sensitivity from the film contained in the film cassette 7 shown in FIG. 2, is used and the end edge of the cutout of such other film cassette is in abutment against a highest step 18a of the offset portion of the abutted tip 18, the bifurcated member 15 will be moved in the anticlockwise direction, as seen in FIG. 3, from the position shown in FIG. 2. This causes the diaphragm plate 25 to rotate in the direction of arrow a through the pin, so that a smallest width portion 29a of the diaphragm aperture 29 will be disposed in the path of the reflected light from the prism to the light-receiving member 30, As aforementioned, the volume of light incident on the light-receiving member 30 can be automatically adjusted in conformity with the film cassette inserted in the cassette housing or the sensitivity of the photosensitive film used. This permits the built-in exposure meter to automatically adjust a lens aperture control (not shown) of the taking lens to give optimum exposure to the particular photosensitive film used in conformity with its sensitivity.

The object of this invention can be attained by forming the diaphragm plate, for adjusting the light incident on the light-receiving member 30, integrally with the bifurcated member. FIG. 4 shows an embodiment of the invention in which the diaphragm plate 125 is formed integrally with the bifurcated member 122 at its free end. In this embodiment, the highest step 118a of the offset portion of the abutted member 118 is abutted against and pushed by the end edge 109a of the film cassette 108, with the smallest width portion of the diaphragm aperture being disposed in the path of the reflected light from the prism. Maximization of the amount of movement of the diaphragm plate requires that the distance between the pivotal shaft 114 and the diaphragm aperture is greater than the distance between the pivotal shaft 114 and the abutted tip, when the diaphragm plate is formed substantially integrally with the bifurcated member. The detailed construction and shape of the bifurcated member are not limited to the specific embodiments shown but may be determined freely depending on the camera in which the present invention is incorporated. The relative positions of the abutted tip of one arm of the bifurcated member, the operation end of the other arm thereof, and the supporting shaft thereof are limited to a certain degree. The supporting shaft of the bifurcated member must be disposed in a direction normal to the optical axis O and near the right-angle apex of a right-angled triangle whose oblique side corresponds to a line connecting the downwardly bent portion 23 or the aperture 129 which is the operation end of the bifurcated member and the abutted tip 18 of the bifurcated member.

FIG. 5 shows another embodiment of the abutted tip of the bifurcated member having an inclined rearwardly directed edge in place of the offset edge formed in steps. Errors in the volume of light incident on the light-receiving member can be eliminated by successively varying the dimension of various portions of the opening in the embodiment which has an inclined edge as shown in FIG. 5 in place of the offset edge as shown in FIG. 4. Since the abutted tip extends into the film cassette housing, it is not possible to insert the film cassette sidewardly. Accordingly, the film cassette is inserted into the cassette housing by moving the same obliquely forwardly through the opening of the cassette housing. To facilitate this film cassette insertion operation, the abutted tip is inclined outwardly to form an angle with respect to the optical axis O. The optic angle for this angle of inclination is about 10°. By providing this angle of inclination, it is possible to readily insert the film cassette in the cassette housing and at the same time to obviate damage which might be caused to the abutted tip of the bifurcated member in leading the camera with a film cassette.

What we claim is:

1. In a camera arranged for use with a film cassette containing photographic film of a preselected light sensitivity, and having an exposure meter, the camera having a taking lens on an optical axis and a diaphragm interposed in the path of light passing through the taking lens and incident upon the exposure meter to adjust the volume of light incident upon the exposure meter, the improvement comprising, in combination, said camera having a sidewall formed with a recessed housing therein to receive a cassette with a snug fit, the recessed housing having a front wall juxtaposable with the front wall of the cassette upon insertion of the cassette fully into the recessed housing; a lever mounted in said camera for pivoting about a pivot axis perpendicular to said optical axis said lever having a first arm operable to adjust said diaphragm and a second arm having a free end, constituting an abutted tip, extending through an aperture in said recessed housing front wall and into said recessed housing; and means biasing said lever to pivot in a direction projecting said abutted tip further into said recessed housing; the cassette front wall being formed with a cutout therein having an edge cooperable with said abutted tip to pivot said lever to adjust said diaphragm; said cutout edge having a preselected position correlated with the light sensitivity of the film in the cassette, whereby the adjustment of sad diaphragm by pivoting of said lever corresponds to such light sensitivity; the location of said abutted tip in said recessed housing, and the fit of the cassette into said recessed housing, being such that the cassette cannot be inserted into said recessed housing by being bodily moved perpendicular to said camera sidewall without striking said abutted tip, so that the cassette, during insertion into said recessed housing, must be initially inclined at an angle to said camera sidewall and then moved forwardly and inwardly into said recessed housing; at least that portion of said abutted tip extending into sad recessed housing being inclined outwardly toward said camera sidewall at an angle correlated to the initial inclination angle of the cassette, to facilitate smooth entry of said abutted tip into said cutout to cooperate with said cutout edge.

2. In a camera, the improvement claimed in claim 1, in which the edge of said abutted tip engageable with said cutout edge is formed with a plurality of steps displaced in the direction of said optical axis and cooperable with said cutout edge.

3. In a camera, the improvement claimed in claim 2 in which the edge of said abutted tip cooperable with said cutout edge is formed as an inclined edge displaced in the direction of said optical axis.

4. In a camera, the improvement claimed in claim 2, in which the free end of said first lever arm is bifurcated to embrace a pin connected to said diaphragm; said diaphragm being pivotally mounted in said camera.

5. In a camera, the improvement claimed in claim 2 in which said first lever arm has a free end bent at an angle thereto and constituting said diaphragm; said free end of said first lever arm being formed with an elongated aperture whose dimension is varied in stages and extending transversely of the light ray incident on said exposure meter.